United States Patent
Siri et al.

(10) Patent No.: US 7,564,149 B2
(45) Date of Patent: Jul. 21, 2009

(54) SEQUENTIALLY-CONTROLLED SOLAR ARRAY POWER SYSTEM WITH MAXIMUM POWER TRACKING

(76) Inventors: Kasemsan Siri, 16623 Purche Ave., Torrance, CA (US) 90504; Richard L. Weinbrenner, 2228 SW. Gull Harbor, Palm City, FL (US) 34990

( * ) Notice: Subject to any disclaimer, the term of this patent is extended or adjusted under 35 U.S.C. 154(b) by 267 days.

(21) Appl. No.: 11/179,284

(22) Filed: Jul. 12, 2005

(65) Prior Publication Data

US 2006/0017327 A1 Jan. 26, 2006

Related U.S. Application Data

(60) Provisional application No. 60/589,705, filed on Jul. 21, 2004.

(51) Int. Cl.
*H02J 1/00* (2006.01)
*H02J 3/00* (2006.01)
(52) U.S. Cl. ........................................................ 307/80
(58) Field of Classification Search .................. 307/82, 307/80, 85, 45, 71, 77
See application file for complete search history.

(56) References Cited

U.S. PATENT DOCUMENTS 6,262,558 B1 * 7/2001 Weinberg ................... 320/101

| | | |
|---|---|---|
| 6,281,485 B1 | 8/2001 | Siri |
| 6,369,462 B1 | 4/2002 | Siri |
| 6,433,522 B1 | 8/2002 | Siri |
| 6,617,831 B2 * | 9/2003 | Perol ........................... 323/234 |
| 6,979,986 B2 * | 12/2005 | Liegeois ..................... 323/282 |
| 2004/0066094 A1 * | 4/2004 | Suzuki et al. ................. 307/18 |

* cited by examiner

*Primary Examiner*—Albert W Paladini
*Assistant Examiner*—Carlos Amaya
(74) *Attorney, Agent, or Firm*—Jeffrey Calfa

(57) ABSTRACT

A power and control architecture employing circuitry that sequentially regulate power flows from independent solar-array sources or a mixture of power sources providing power to a common load. The device may be used on a satellite with solar-array sources; however it may also be used on ground based systems. Stiff bus voltage regulation is obtained by tightly controlling the most recently activated power-processing channel while keeping the previously activated power-processing channels in the Maximum Power Tracking mode to supply maximum power to a common load. The remaining power-processing channels are turned off or operated in stand-by mode. In an alternative system, with primary design goal of uniform power sharing among solar-array sources, all solar array sources are activated with uniform power sharing at light load and, as load demand increases, sequentially controlled to operate in the Maximum Power Tracking mode one solar array source at a time as necessary.

6 Claims, 14 Drawing Sheets

Fig. 1 N-channel distributed solar-array power system - 101 -

N-channel distributed solar-array power system with streamlined control - 201-

Fig. 3   Streamlined Architecture -301-

Battery dominated bus power system with sequentially-controlled MPT array sources - 501 -

Sequentially-controlled distributed-source power system - 601 -

Over-current protection sub-system for the power system shown in Fig. 6

Battery dominated power system - 701 -

Fig. 9  Modular converter and control architecture - 602 -

Sequentially-controlled power system with modular converters - 801 -

Optimized distributed power system with uniform current-sharing control through the modified MPT (MMPT) controllers - 901 -

901

Modified MPT Controller -707-

1001

SEQUENTIALLY-CONTROLLED SOLAR ARRAY POWER SYSTEM WITH MAXIMUM POWER TRACKING

This is a non-provisional patent application claiming priority of provisional patent application Ser. No. 60/589,705, dated 21 Jul. 2004.

BACKGROUND OF INVENTION

The invention relates to the regulation of groups of power sources, which may be uniform such as solar-array sources, or may be a mixture between solar-array sources as well as other power sources. The common element is that the invention involves limiting the amount of individual power source voltage regulation allowing all but one of the active devices to be operating at either a maximum or optimum level of operation.

Prior art conventional satellite power systems employ linear-shunt regulators that are terminated across their distributed solar-array sources as a means to regulate the system bus voltage. For stiff bus voltage regulation within an operating load range, a number of linear-shunt devices are turned-off to fully enable their respective solar array currents to charge the output bus voltage and load circuit. Concurrently, other linear-shunt devices are turned-on to completely shunt their respective array currents from the output bus while other shunt devices are linearly controlled to partially shunt some of their respective array currents. Partial and/or complete shunting of the array current to the power return path results in satellite heating due to unnecessary thermal stress on the shunt devices. By adding a tapped terminal for each array source and placing its respective shunting device between the tapped and power return terminals, the shunt-device voltage as well as the device's thermal stress is further reduced. However, thermal stress remains significant and continues to degrade spacecraft reliability. These solar array channels may have a dedicated number of shunt devices that are sequentially turned off as load demand increases. The solar array channels that belong to the partially turned-on and completely turned-off shunt devices supply sufficient flow of power to regulate the bus voltage and fulfill load demand. To insure sufficient bus voltage near end-of-life (EOL), the regulated bus voltage is usually set significantly below the beginning-of-life (BOL) peak-power voltage of each solar array channel, resulting in poor utilization of available power from the activated solar array channels.

This invention involves is a highly efficient power and control architecture employing distributed dc-dc converters, which sequentially regulate power flows from independent solar-array sources to a common load. The invention will significantly reduce power dissipation in power electronic circuits that are used to process the solar array power. The system will maximally utilize the available power of the activated array channels as load demand increases. There should be significantly reduced thermal stress on the array channels that participate in maximum power transfer. The system achieves the regulated bus voltage while all but one of the activated array channels are in maximum power tracking mode. It allows power expansion capability through parallel-connection of Commercial-off-the-Shelf (COTS) dc-dc converters. The system has applicability to other types of conventional and renewable energy sources (utility grid, fuel cells and wind generators).

The sequentially-controlled solar array power system offers a certain sequence of maximum utilization of the distributed solar array sources. Every solar array source will be assigned its own turn (or priority) to participate in the output voltage regulation while the previously activated array sources have already operated in their maximum power tracking modes. This sequential control scheme also allows different type of distributed power sources to work together in a proper order of control priority to minimize the long-term cost of obtaining electrical energy. Furthermore, the control priority (or sequence of power channel activation) for each power channel can be changed with respect to others to best suit the economical and/or practical circumstances that may be different for various geographical areas where the same power system may be differently located. Furthermore, the proposed invention offers the complete bypass (or take-over) of all internal output voltage regulation control loops existing among COTS converters connected in parallel. In general, these control loops in COTS converters cannot be assumed to be identical. The proposed invention employs only one common voltage regulation controller that has only one voltage reference and deliver only one common error signal to control all the power channels.

SUMMARY

This invention involves is a highly efficient power and control architecture employing distributed dc-dc converters, which sequentially regulate power flows from independent solar-array sources or a mixture of power sources providing power to a common load. The device may be used on a satellite with solar-array sources, however it may also be used on ground based systems where efficiency, ease of control, and simplicity of regulation are important. In a system made in accordance with this design, stiff bus voltage regulation is obtained by tightly controlling the most recently activated dc-dc converter power-processing channel while keeping the previously activated power-processing channels in the Maximum Power Tracking (hereinafter "MPT") mode to supply their maximum power to the common load. The remaining inactive dc-dc converter power-processing channels are turned off or operated in stand-by mode, which results in lower satellite thermal stress levels. Since nearly all activated power-processing channels are operated in MPT mode, maximum solar-array utilization results and the MPT-controlled solar array sources perform with significantly lower thermal stress levels, which in turn slow down the rate of array degradation. When compared to conventional linear-shunt regulator architectures, the sequentially controlled converter architecture offers several advantages. First, it allows 25% more achievable power throughput over the designated life of the spacecraft with typical 33% array degradation at EOL. Second, it permits a reduction in array cable mass due to the elimination of array-tapped terminals. Finally, it facilitates a reduction in overall power system weight since the highly efficient dc-dc converter power-processing channels require less thermal management hardware.

DRAWINGS

DESCRIPTION OF INVENTION

The invention is a highly efficient power and control architecture or circuit or system employing distributed direct current to direct current (dc-dc) converters. The dc-dc converters sequentially regulate power flows from independent solar-array sources or a mixture of power sources providing power to a common load. Stiff or tightly banded bus voltage regulation is obtained by tightly controlling the most recently activated dc-dc converter power-processing channel while keeping the previously activated power-processing channels in the maximum power tracking (hereinafter "MPT") mode to supply their maximum power to the common load. The remaining inactive dc-dc converter power-processing channels are turned off or operated in stand-by mode. Since nearly all activated power-processing channels are operated in MPT mode, maximum solar-array utilization results and the MPT-controlled solar array sources perform with significantly lower thermal stress levels, which in turn slow down the rate of array degradation. The sequential regulation of the power and control architecture may be used on systems with different sources which may include solar arrays as well as other power sources.

Figure 1:
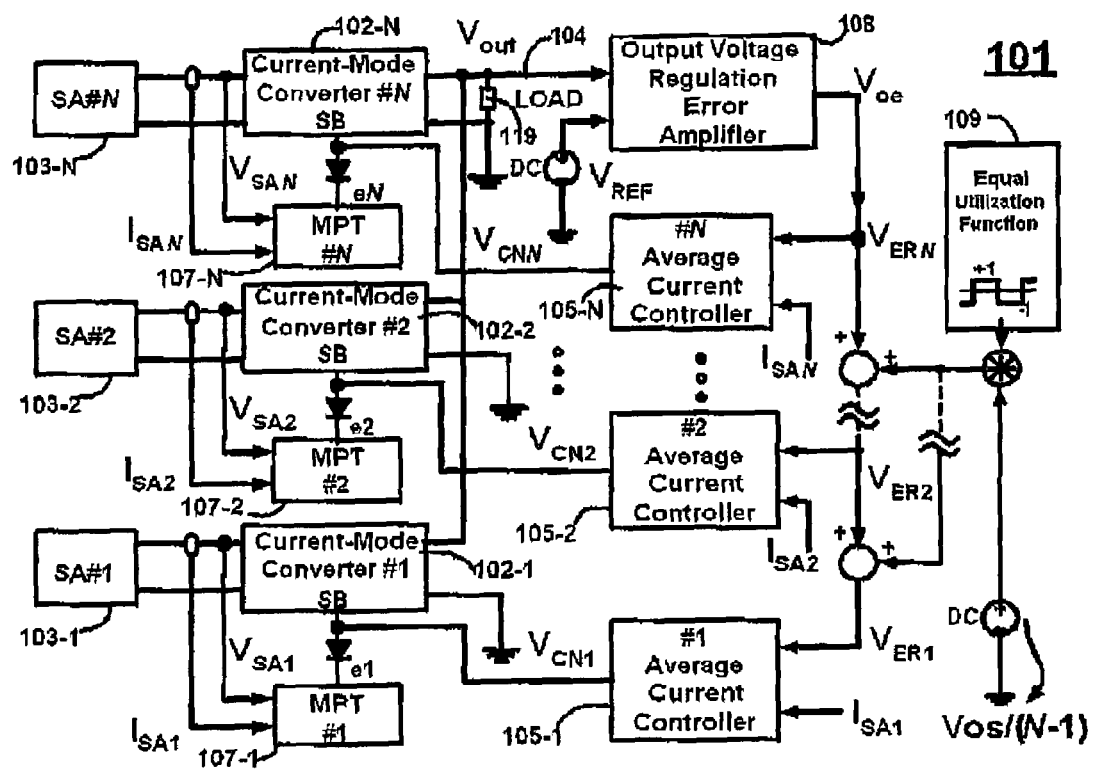
FIG. 1 depicts an N-channel distributed solar array power and control architecture made in accordance with the invention that provides both stiff output voltage regulation and maximum power tracking.

The invention in a most basic form involves a set of power sources engaged to a power bus containing at least one load. The power sources are sequentially engaged onto the power bus. As a power source is engaged and until it reaches either a maximum or optimum power level, the power source most recently engaged to provide power to the bus maintains the entire bus voltage. Once the sequenced power source reaches a maximum or optimum power level, the next sequential power source is engaged to power the bus and this latest power source then regulates bus voltage stiffening it. FIG. 1 depicts an N-channel distributed solar array power and control architecture system 101 that provides both stiff output voltage regulation and maximum power tracking. Dedicated current-mode dc-dc converters 102 (individually reference labels 102-1 to 102-N) control up to N solar-array sources 103 (individually labeled 103-1 to 103-N), which are sequentially activated to transfer power to the regulated bus and load circuit 104 with load 119. The average-current controllers 105 (individually labeled 105-1 to 105-N) and/or its MPT circuit 107 (individually labeled 107-1 to 107-N) drive the dc-dc converters 102-1 to 102-N through an included "shared bus" (SB) control pin. For the most recently activated converter channel, its average-current controller 105 operates in the linear region to tightly regulate respective array current that in turn provides stiff output voltage regulation ($V_o$) while the respective MPT control circuit 107 has no controlling effect. On the other hand, each of the previously activated MPT 107 controlled converter channels clamps the array voltage to its corresponding peak-power voltage while the respective average-current controller is over-driven thus providing no controlling effect. The outermost control loop is designed for output voltage regulation (OVR) whereby the error amplifier 108 provides error voltage $V_{oe}$ as the main driving signal for sequentially commanding all of the average-current controllers 105-1 to 105-N. Prior to distribution of the error voltage $V_{oe}$ to the individual average-current controllers 105, equally stepped dc offset voltages are superimposed on $V_{oe}$ to produce equally decreasing ladder error signals $V_{ER1}, V_{ER2}, \ldots V_{ERN}$ which become the current set point command voltages to the respective average-current controllers 105-1, 105-2, ..., 105-N.

$V_{OS}/(N-1)$, is slightly smaller than the linear control range of each average-current controller 105, such that overlap is minimized between two linearly-controlled array currents individually regulated by two adjacent power channels. Accordingly, the solar array sources 103-1 to 103-N and their respective converter channels 102-1 to 102-N are sequentially activated in order starting with channel #1 (then #2, ... up to #N) depending on the conditions of the load and array sources 103-1 to 103-N. Similarly, the system operation can also operate in a opposite sequence of control activation by sequentially activating the array sources 103-N to 103-1 and their respective converter channels 102-N to 102-1 in a descending order with channel #N (then #N−1, ... down to #1). Furthermore, near uniform utilization of all the array and power converter channels is achievable through alternately and equally operating both control sequences by the use of programmable utilization function that has its control value of either 1 or −1 equally distributed in time.

Figure 2:
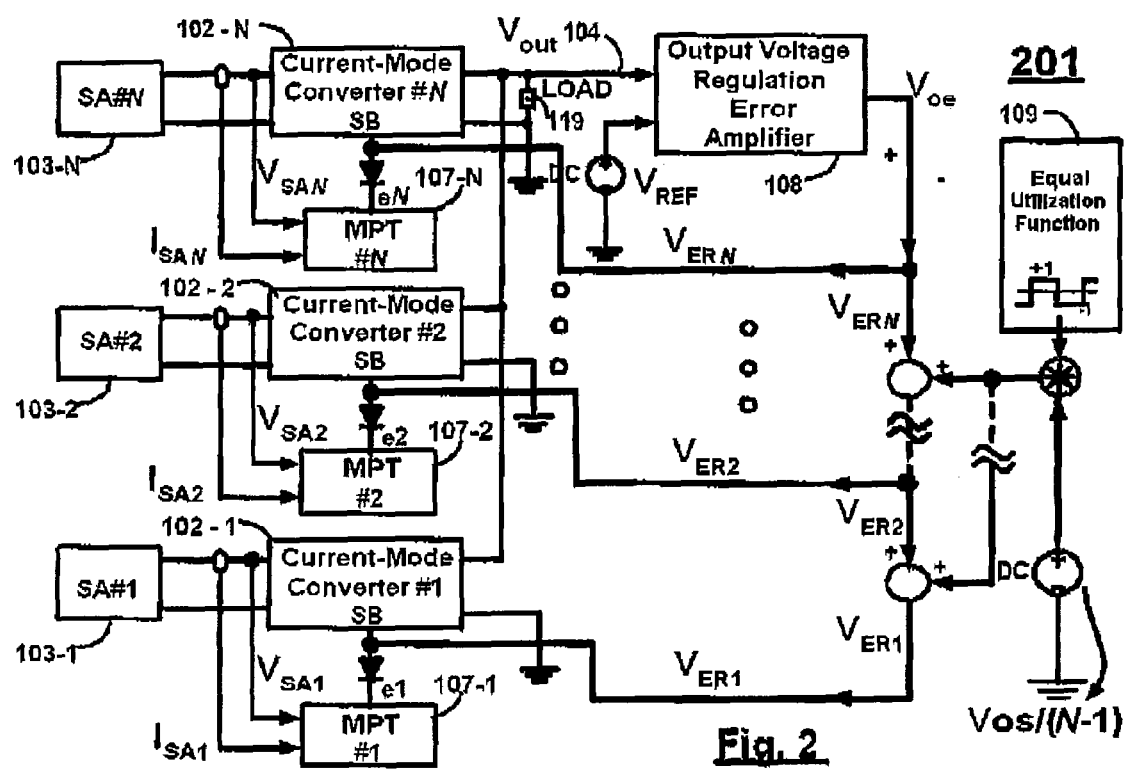
FIG. 2 depicts a second embodiment of a power and control architecture used for sequentially-control distributed array sources similar to FIG. 1 without inclusion of the average current controllers.

FIG. 2 also reveals the similar power and control architecture 201 used for sequentially-control distributed array sources without inclusion of the average current controllers as long as the current-mode dc-dc converter 102-1 to 102-N power stages are employed. In the same manner, the solar array sources 103-1 to 103-N and their respective converter channels 102-1 to 102-N are sequentially activated in an ascending order starting from channel #1 toward channel #N depending on the conditions of the load 104 and array sources 103-1 to 103-N. Similarly, the system operation can also operate in an opposite sequence of control activation by sequentially activating the array sources and their respective converter channels in a descending order starting from channel #N toward channel #1. Again, nearly uniform utilization of all the array and power converter channels is achievable through alternately and equally operating both ascending and descending control sequences by the use of programmable utilization function that has its control value of either 1 or −1 equally distributed in time.

Figure 3:
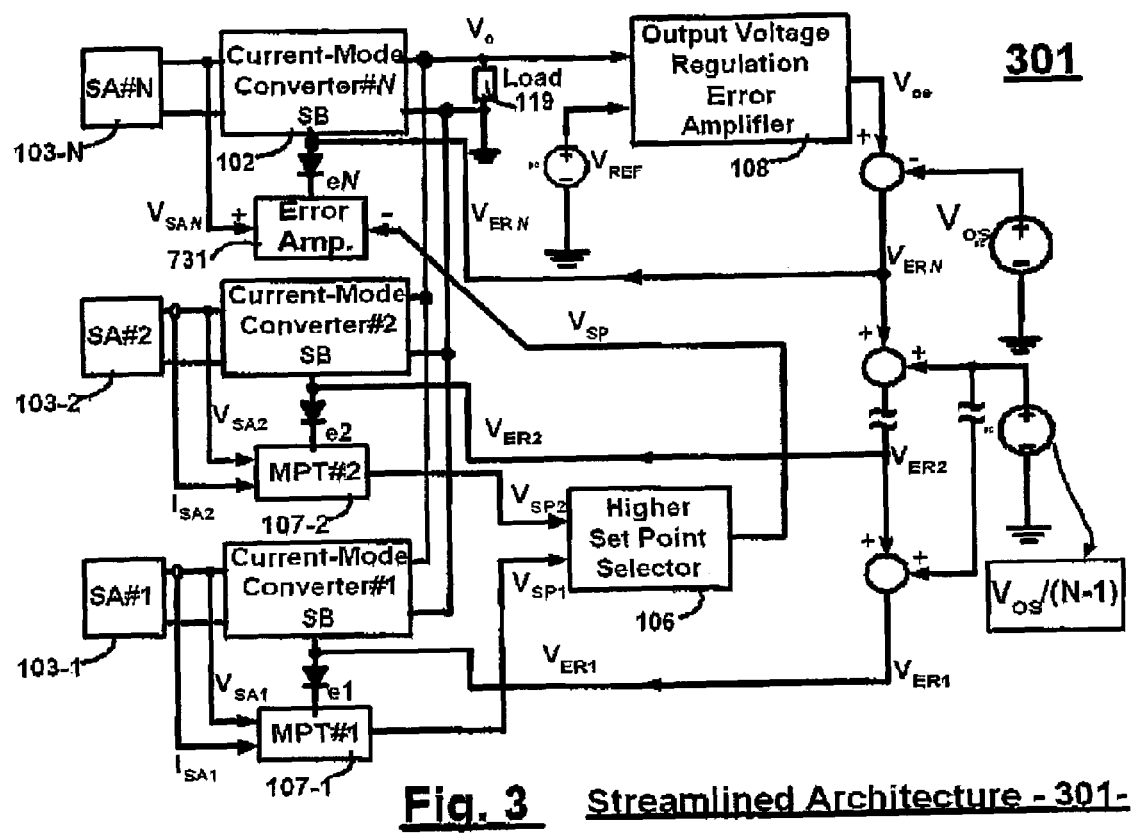
FIG. 3 depicts a power and control architecture with at least three power channels utilizing matched solar-array sources made in accordance with the invention and having only two MPT controllers dedicated to the first two activated power channels.

For a system composed of at least three power channels utilizing matched solar-array sources 103-1 to 103-N, it may be more cost-effective to have only two MPT controllers 107 dedicated to the first two activated power channels as shown in FIG. 3. Therefore, the other power channels can contain streamlined controllers that share the higher array-voltage set point selected from the first two MPT controllers 107 thus providing uniform solar array voltage clamping for subsequent power channels.

There are different types of Maximum Power Tracking circuits that may operate in this architecture. Any of these can be employed in the circuit architecture of this invention. Some examples of MPT circuits are described in the maximum power tracking power system architectures patented under U.S. Pat. Nos. 6,281,485; 6,369,462; and 6,433,522 (these patents are incorporated by reference into this patent), however these are not exclusive. In some of these MPT circuits in the listed patents, there is a dither signal is employed. Where such dither signal is employed in an embodiment such as that shown in FIG. 3, the streamlined controllers 107-3 to 107-N for channel #3 and above do not need to include array peak-power voltage tracker circuits 107 but instead, accept the higher array-voltage set point as a common command that excludes the ac dither signal. In this manner, the system 101 can achieve almost zero array ripple voltages at the dither signal frequency, resulting in a significant reduction of array voltage ripple belonging to the most recently activated power channel that usually regulates the output voltage. Furthermore, out-of-phase dither signal injection into the first two respective MPT controllers 107-1 and 107-2 can be implemented leading to array-current ripple cancellation. Lower ripple current is generated by the first two activated power channels; leading to further reductions in array voltage ripple belonging to the most recently activated power channel. Furthermore, MPT controllers 107-1 and 107-2 may employ the well-validated MPT approach with proper dither-signal injection.

Figure 4:
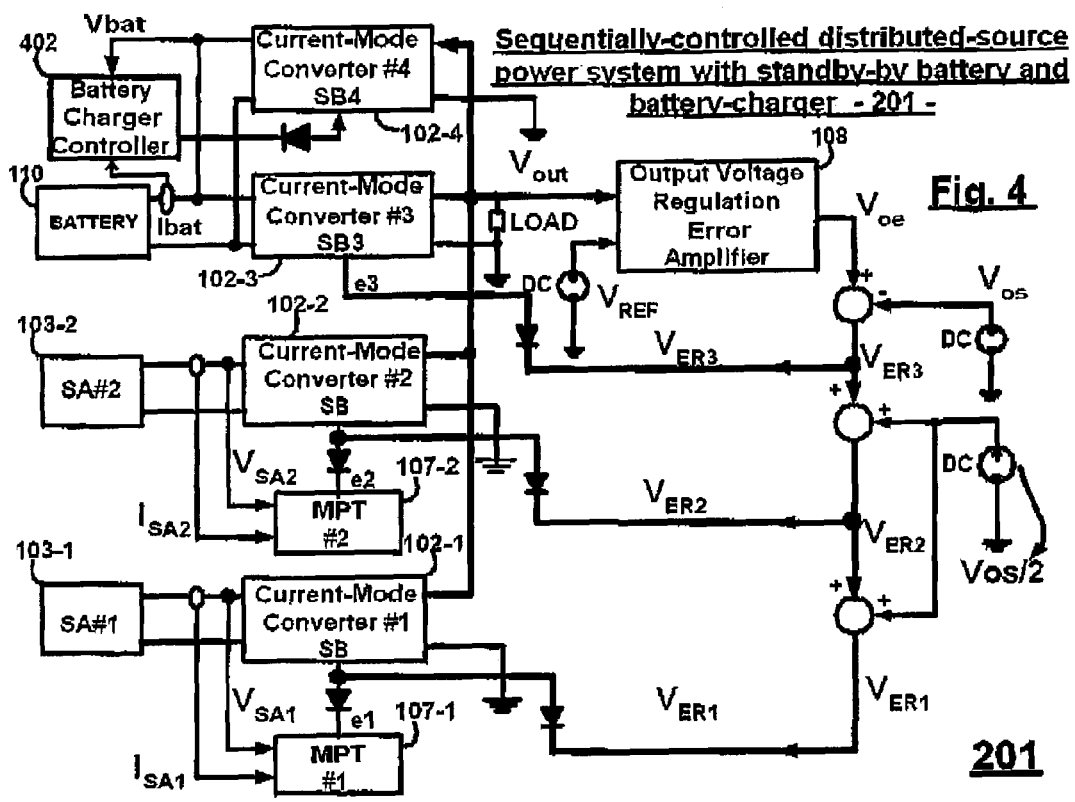
FIG. 4 depicts a fourth embodiment of a power and control architecture made in accordance with the invention used for sequentially-control distributed array sources.
Figure 5:
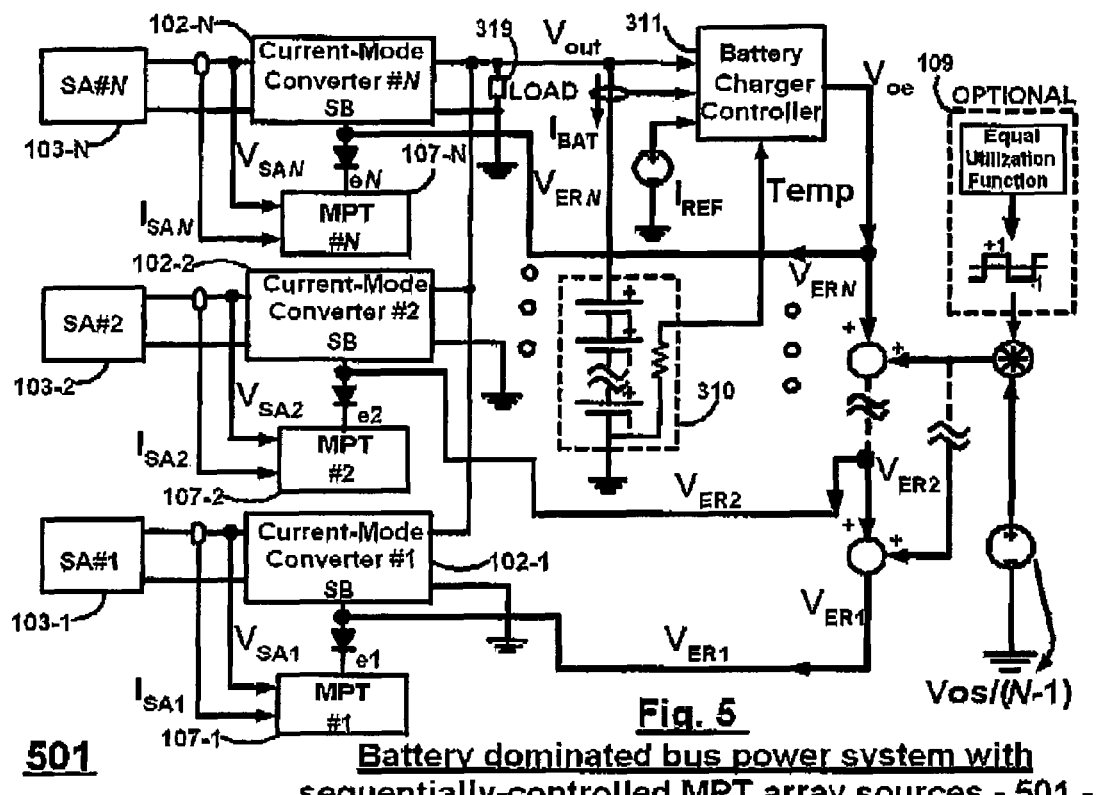
FIG. 5 depicts a battery dominated embodiment power and control architecture made in accordance with the invention for used for sequentially-control distributed array sources.

FIGS. 4 and 5 provide some variations of the power and control architectures, 201 and 301 respectively, that are based on the same control scheme for sequentially-controlled distributed power sources. FIG. 4 emphasizes that the last activated power channel is for the stand-by battery source 110 (channel #3 for 3-channel system or #N for N-channel system) that is typically in the stand-by charging mode through the charge converter 102-4 (102-N+1). Whenever there is insufficient array power to regulate the bus Vout, the stand-by charging mode is terminated and the stand-by battery 110 power channel is activated for the bus voltage regulation.

FIG. 5 employs a slightly different architecture 301 that the bus voltage is the battery voltage. Thereby, this architecture is called is a battery-dominated bus sequentially-controlled power system with MPT. The battery 310 voltage is not tightly regulated but the charging current into the battery 310 must be properly regulated by Battery Charger Controller 311 to ensure that the battery 310 will not experience excessive temperature rise due to the heat dissipation produced by the charging current. Therefore, proper battery voltage and temperature profiles will be assigned to the battery so as to not cause the battery voltage to exceed its maximum limit at a given temperature level. The obvious benefit of the battery-dominated bus power system 301 is in the capability of supplying much higher transient peak power to the load 319 than the total peak power that all the solar array sources 103 (103-1 to 103-N) can provide. Since the battery 310 has sufficient capacity to support numerous higher transient power demands while the average power demand from the load 319 is sufficiently below the total peak power of all the solar array sources 103, the battery 310 is able to restore its healthy state of charge while the excess array power feeds the load demand.

During typical normal load demand and the solar energy is still available from the array sources 103, the power system 301 is controlled to operate in the battery charging mode by regulating battery charging current and at the same time the solar array sources 103 support all the load demand 319. When the load demand is light and the battery 310 is fully charged, only a few power channels are activated to supply power to the load 319 and to keep the battery 310 in the fully charge condition. As load 319 demand increases, one or more power channels are activated and controlled to keep the battery 310 in the fully charge state most of the time. As previously described, the solar array sources 103-1 to 103-N and their respective converter channels 102-1 to 102-N are sequentially activated in an ascending order starting from channel #1 toward channel #N depending on the conditions of the load 319 and array sources 103. Similarly, the system operation can also operate in an opposite sequence of control activation by sequentially activating the array sources 103 and their respective converter channels 102 in a descending sequence starting from channel #N toward channel #1. Again, nearly uniform utilization of all the array 103 and power converter 102 channels is achievable through alternately and equally operating both ascending and descending control sequences by the use of programmable utilization function that has its control value of either 1 or −1 equally distributed in time.

Figure 6:
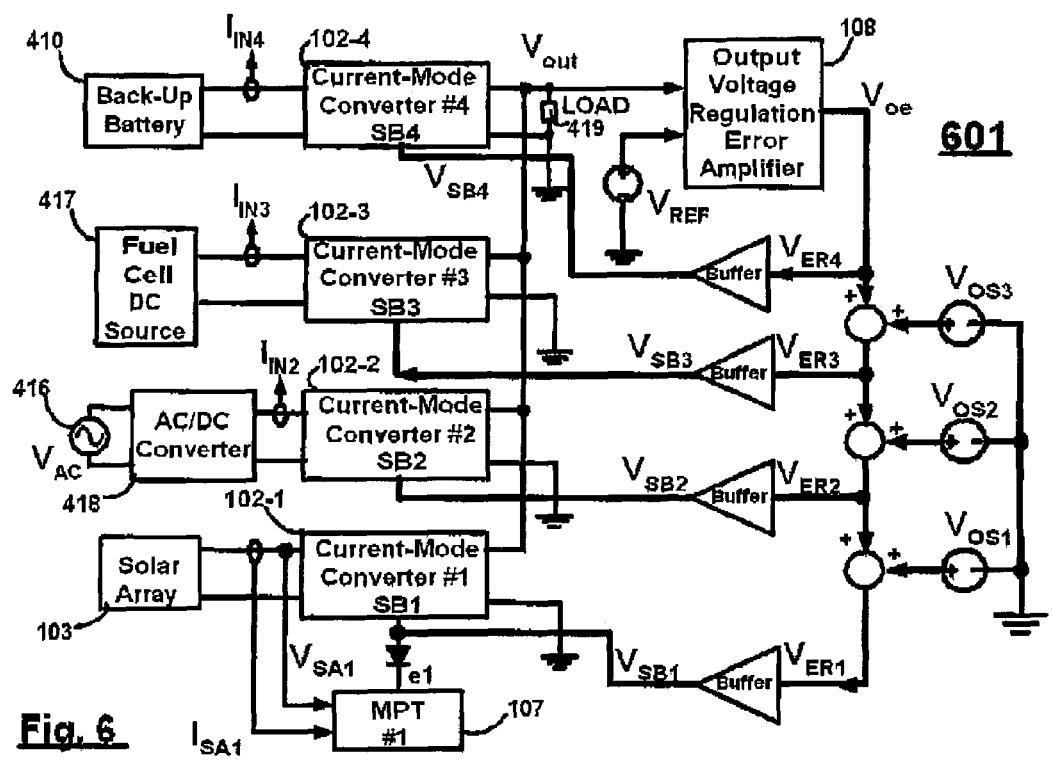
FIG. 6 depicts a sixth embodiment of a power and control architecture made in accordance with the invention used for sequentially-control distributed power sources of different types.

FIG. 6 provides another embodiment architecture 401 that emphasizes various types of distributed power sources that are sequentially controlled with the order of priority starting from solar array source 103 to the back-up battery source 410. For output voltage regulation, solar array power 103 is utilized until it is saturated at a maximum power of the array first using the MPT 107, following by the AC voltage source $V_{ac}$ 416, the fuel cell DC source 417, and finally the back-up battery 410. The AC source 416 can be a stand-alone AC generator or an AC utility grid of which the AC voltage is converted to an unregulated DC voltage through an AC/DC converter 418 such as a full-bridge rectifier with a capacitor filtering output. The AC/DC converter 418 can be a full-bridge rectifier connected in cascade with a front-end power factor correction DC-DC converter. Since the cost of producing fuel supplied to the fuel cell source 417 is still more expensive than the cost of utility grid power, fuel cell DC source 417 is assigned to have the priority next to the AC power source 416. However, the sequential control priority between the AC power source 416 and the fuel cell source 417 can be interchanged depending the relative cost of production and maintenance of these two types of power sources. The back-up battery 410 is assigned to have the lowest priority since the battery 410 has limited reliability and is designed to be utilized for a short period of time. The shared-bus control signals (Vsb1, Vsb2, Vsb3, and Vsb4) for the respective power channels are buffered for fault tolerance of inadvertent short-circuit of any share bus control port (SB1, SB2, SB3, and SB4).

The power system 401 is also capable of tolerating a power failure of any power channel since the system output voltage regulation controller 408 autonomously asserts sufficient common error signal Voe to provide enough power flow to regulate the output voltage Vout. Offset voltages Vos1, Vos2, and Vos3 are not always set at the same DC value since different power channels need different ranges of control signals $V_{ER1}$, $V_{ER2}$, $V_{ER3}$, and $V_{ER4}$ to regulate their respective power flows from no load to their full power ratings with minimal overlapped operation between adjacent power channels.

Figure 7:
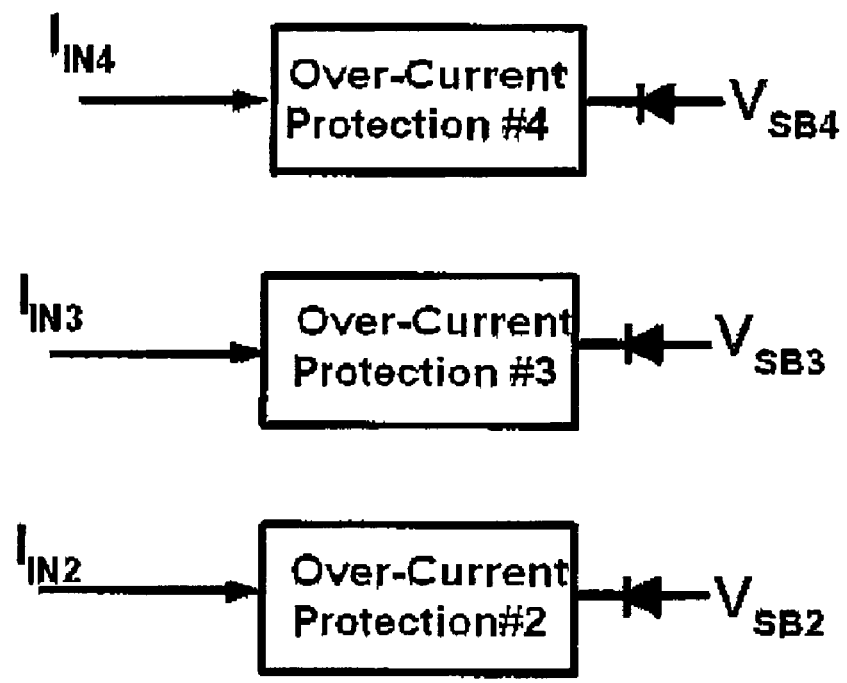
FIG. 7 depicts the over current protection sub-system for the power system shown in FIG. 6.

FIG. 7 provides the over-current protection control block diagram where the sensed input currents Iin2, Iin3, and Iin4 of the three power channels (shown in FIG. 6) are respectively used to determine the proper pull-down signals through their pull-down diodes to the shared-bus signals Vsb2, Vsb3, and Vsb4. Thereby, this prevents any power channel from drawing too much current from its respective power source to ensure good system reliability.

Figure 8:
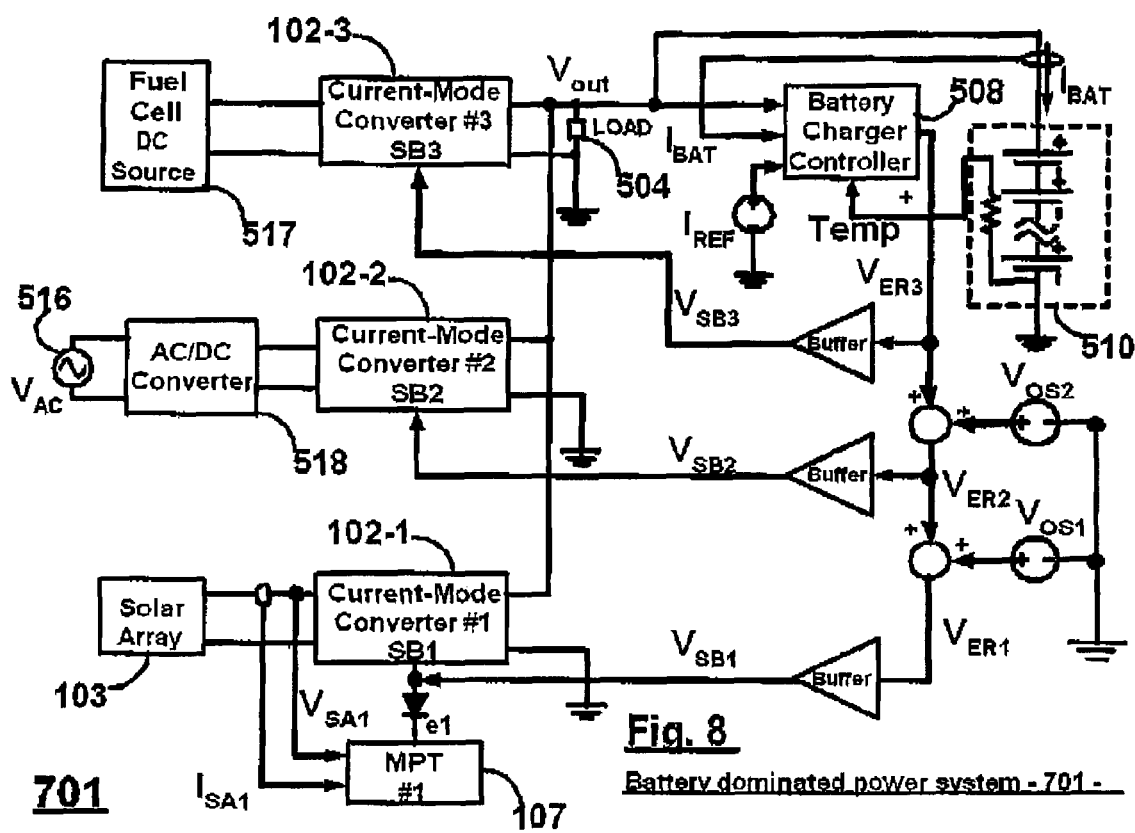
FIG. 8 depicts a seventh embodiment sequentially controlled power system with various distributed power sources made in accordance with the invention.

FIG. 8 provides a similar battery-dominated power system 501 as previously shown in FIG. 5 except with more emphasis on different types of the distributed power sources. The architecture 501 shown helps demonstrate the control concept and is expandable to more than three power channels. In general, all kinds of conventional power sources and renewable energy sources can coexist under the same power system and control architecture with non-uniform offset voltages being added to the common error signal that are delivered by the battery charger controller. FIG. 8 is very similar to FIG. 1 from the standpoint of a control solution. The Output Voltage Regulation block 108 is replaced by a Battery Charger Controller Block 508. While the Output Voltage Regulator 108 has the control goal of producing a stable regulated Vout bus 104 regulated to a target voltage, the Battery Charger Block 508 has the control goal of monitoring and controlling the charge current of the battery 510, note the little circle symbol at the top of the battery 510 which is the charge current sensor. Thereafter, the function of the Battery Charger block 508 or the Voltage Regulation block 108 manages the input power sources the same way. That is to say it bring on line Solar Array 103-1 first to use that free energy to the maximum extent possible, then if AC line power 516 with its associated AC/DC converter 518 is available it uses that to maximally charge the battery 510 within safe parameters monitored by the battery charger block 508, or in the case of the voltage regulation block 108 it uses the power to stablize or support the output voltage to the load 504. In FIG. 8 it also shows a fuel cell 517, which is likely to be the least economic of the 3 power sources depicted. It is more likely in this kind of case that the fuel cell 517 will only be used if there is an AC line power 516 failure.

Figure 9:
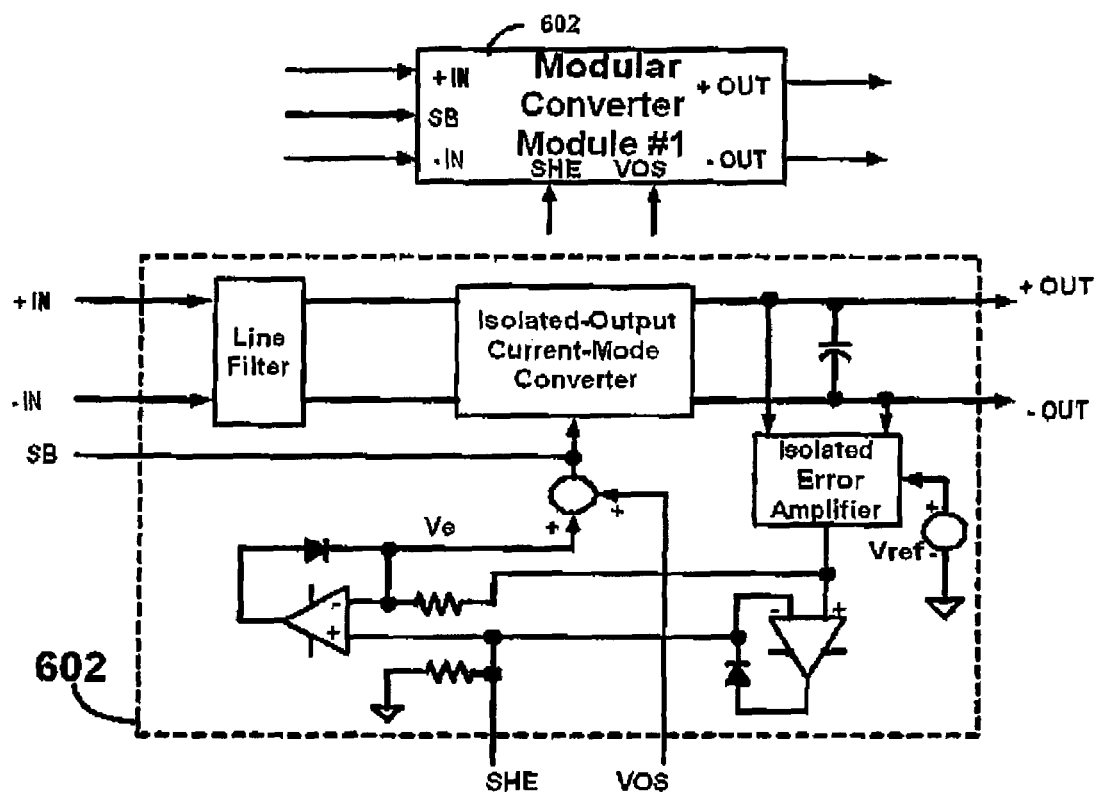
FIG. 9 depicts a modular converter and control architecture made in accordance with the invention.

It is also more advantageous to eliminate the externally common voltage-regulation error amplifier since this can be a single point failure that causes the system output voltage to lose regulation. FIG. 9 reveals a modular power and control architecture for a more robust converter module 602 that can operate in either a stand-alone or a parallel-connected configuration. Through use of ideal rectifier circuits, the shared error signal bus (SHE) serves as the common error voltage signal that governs the sequence of activation of all power channels. As can be further elaborated in the control architecture 601 shown in FIG. 10, SHE's voltage is the highest error signal among all error signals, Ver, that are internally produced within the respective converter modules 602. Consequently, all converter modules 602 will share the same error signal (SHE) and can be sequentially controlled in an order determined by the offset voltages (VOS1, VOS2, and VOS3) that are provided externally to their respective converter modules 602-1 to 602-3. In case of an inadvertent short-circuit across the SHE bus, the internal error signals within the respective converter modules 602 autonomously take over the shorted SHE signal. Thereby, the system output voltage is still regulated with some graceful degradation of the sequential control performance. By reprogramming VOS1, VOS2, and VOS3 voltages, all possible activation sequences of the three power channels can be achieved and it is possible to obtain nearly uniform utilization of all power channels through use of a micro-controller or digital-signal processor (DSP).

Some simple guidelines help the system design achieve robust stability. First, solar-array 103 voltage regulation control is used as the basic control loop of operation for MPT with adequate bandwidth of the control-loop response and sufficient stability margin. Second, the MPT control circuit 107 updates the Voltage Commanding Set-Point (VCSP) slowly and smoothly when compared to the speed of the array voltage regulation control loop. Finally where the MPT circuit is of the kind that uses a dither signal although it need not be, a small but sufficient dither signal, at a low frequency, is superimposed on the VCSP to ensure reliable and predictable processing of the MPT algorithm.

To achieve stability during MPT operation, first the crossover frequency of the array-voltage regulation loop gain (or the unity gain bandwidth) must be sufficient. Second, the resonant frequency of the high-Q, L-C circuit at the converter input must be sufficiently greater than the control loop crossover frequency so that instability due to its peaking effect is not present. This eliminates multiple crossover frequencies around such a resonant frequency. However, if the resonant frequency is designed to be in the vicinity above the loop gain crossover frequency, instability due to resonance peaking effect is very likely. An additional ac damping circuit across the converter input is needed to damp out the resonance peaking effect.

Figure 10:
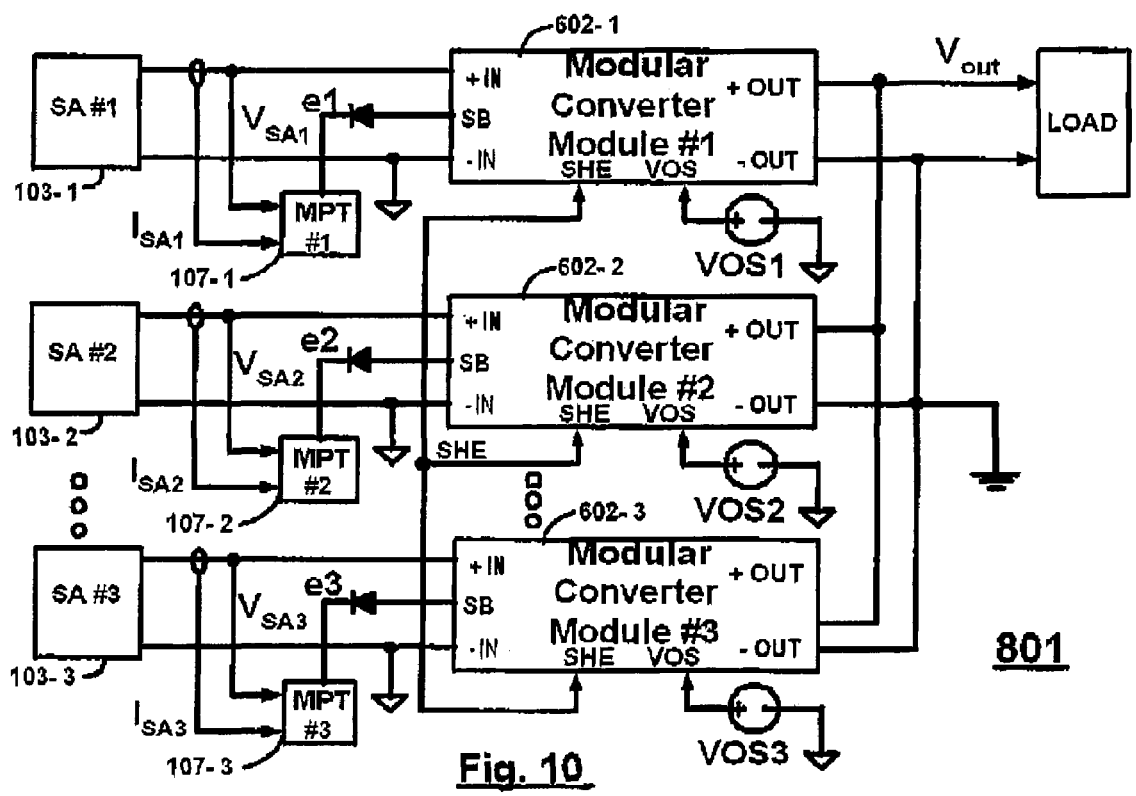
FIG. 10 depicts an eighth embodiment sequentially controlled power system with the modular converters of FIG. 9.
Figure 11:
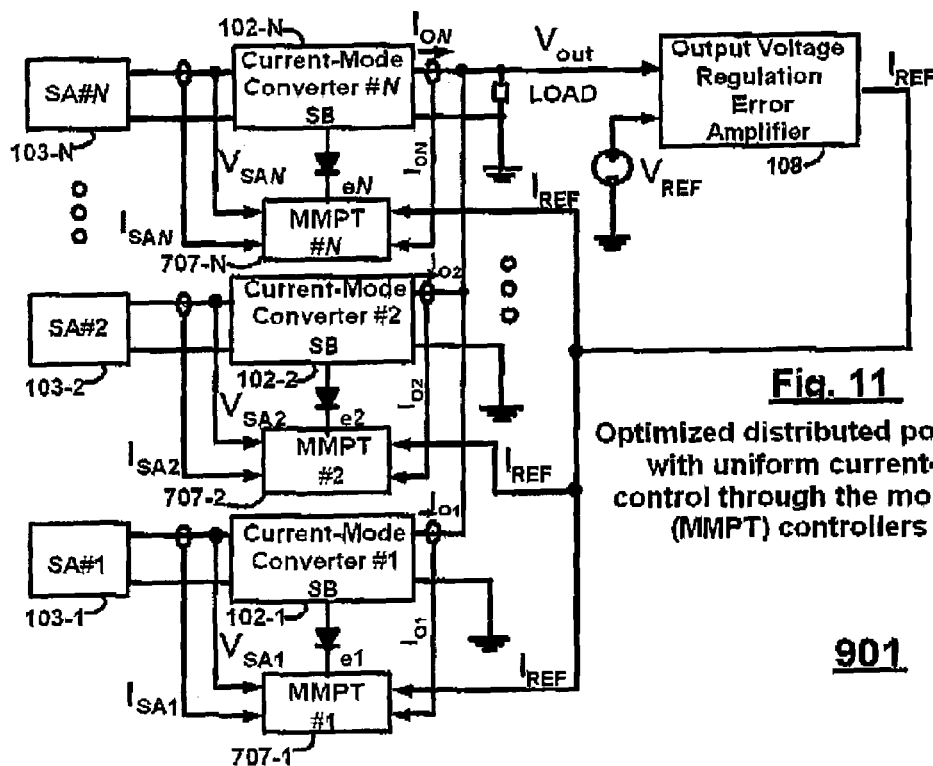
FIG. 11 depicts a hybrid optimized distributed power system with uniform current sharing control ninth embodiment through a modified maximum power tracking controller.
Figure 13:
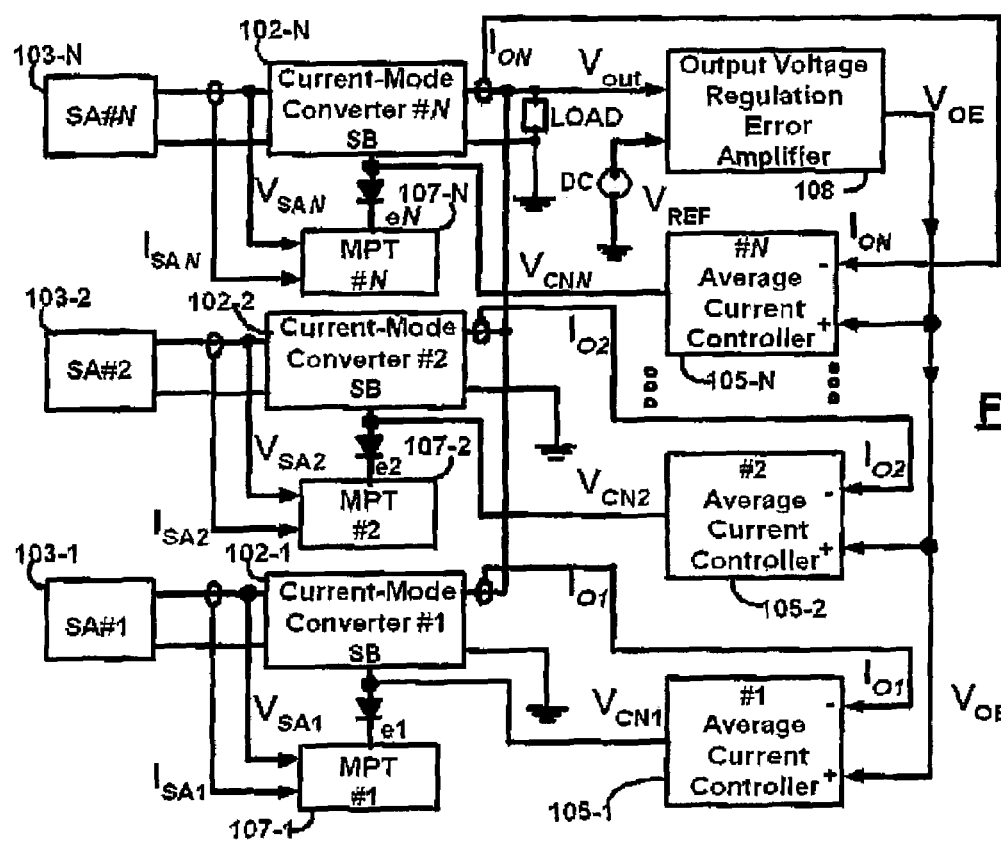
FIG. 13 depicts a tenth embodiment hybrid optimized distributed power system with uniform current sharing control.
Figure 14:
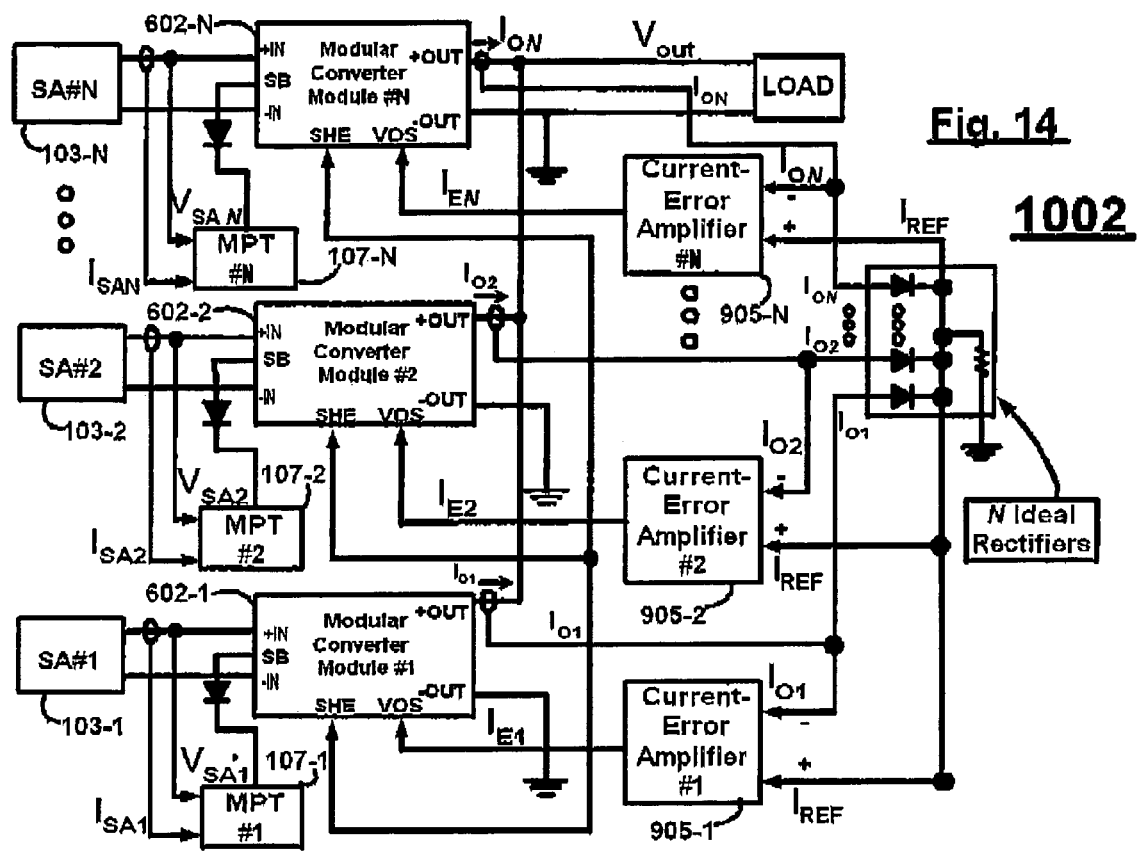
FIG. 14 depicts an eleventh embodiment hybrid optimized distributed power system with uniform current sharing control.

The power system architectures that are presented up to FIG. 10 do not have uniform current-sharing capability among the distributed converter power channels. Lack of uniform current sharing among the distributed output currents of the distributed converters may lead to non-uniform utilization of the distributed solar array sources. Consequently this causes far from uniform distribution of thermal stresses being imposed on the array sources 103. It may sometimes be preferable to achieve near uniform thermal stresses among the distributed array sources, subsequently ensuring uniform degradations of all the solar array sources for their maximum reliability. FIGS. 11 to 14 depict hybrid systems in which there is uniform sharing of load until the weakest array reaches a maximum, at that point the weakest array is removed from voltage controlling and stays in maximum power mode. The other arrays continue to uniformly share the load demand until power delivered from the next weakest array reaches its relative maximum. The term "weakest" array means weakest relative to the rest. The weakest array may be weakest due to relative shading of the array, or age or other factors affecting power output. As one or more arrays shift to be operated at maximum power, then the next weakest power source will automatically operate in MPT mode as the load demand increases further. Except the "set" of weakest arrays, the rest of the arrays are controlled to supply uniform currents to support the load demand and regulate the load voltage. The differences among FIGS. 11, 13, and 14 are in various control configurations to achieve uniform current-sharing among typical or strong array sources and shift into maximum power tracking mode as needed among the weaker array sources.

Near uniform thermal stresses may be achieved by employing the power and control architecture 701 shown in FIG. 11 where the modified MPT controllers 707-1 to 707-N are used instead of the prior art MPT controllers that were described in U.S. Pat. Nos. 6,281,485 and 6,369,462. In each modified MPT controller 707, it also senses two additional feedback signals: its associated converter output current $I_{Oi}$ and the common current reference signal $I_{REF}$ that is the common error signal being produced by the output voltage regulation error amplifier. $I_{REF}$ serves as the common commanding signal to which all the individual converter output currents $I_{Oi}$ (i=1, 2, ..., N) are regulated. Under typical load conditions that are below the total sum of the individual array peak powers, solar array voltages of typical or strong power array sources 103 will be regulated to achieve uniform current sharing among the respective converter output currents. Solar array voltages of weak power array sources 103 will be controlled to settle around their corresponding peak power voltages by the respective MPT controllers. The MPT operation occurs to the weak power solar arrays after the output currents of their respective converters fail to be regulated at the common value being commanded by $I_{REF}$. In this manner, the system achieves nearly uniform power-sharing among the typical or strong power array sources of which their operating voltages are actively controlled to be above their corresponding peak power voltages. Since the common current reference signal $I_{REF}$ is the voltage error signal commonly provided by the output voltage regulation error amplifier, the system output voltage $V_{OUT}$ is also regulated to the target level while peak-powers from the weak power array sources are tracked by their respective MPT controllers and nearly uniform-powers from the typical or strong power array sources are controlled by the output voltage regulation (OVR) controller and the current-sharing controller within the modified MPT controller (MMPT) block 707. As load current increases, additional one or more array sources may have their powers transferred in MPT mode and at least one array source may have their powers transferred in OVR mode. Under an excessive load demand without dedicated overload protection or a typical load condition while all participating array sources are weak, all array sources may be controlled in MPT mode to supply all their available power to the load. The purpose of this is to uniformly reduce thermal stress on the power input sources. It may be the case in many instances that uniformly operating majority of distributed solar array sources at a lower temperature rather than leaving one or more solar array sources in an inactive mode during typical or light load at a much higher temperature can prolong the life and reliability and efficiency of the overall system 701.

Figure 12:
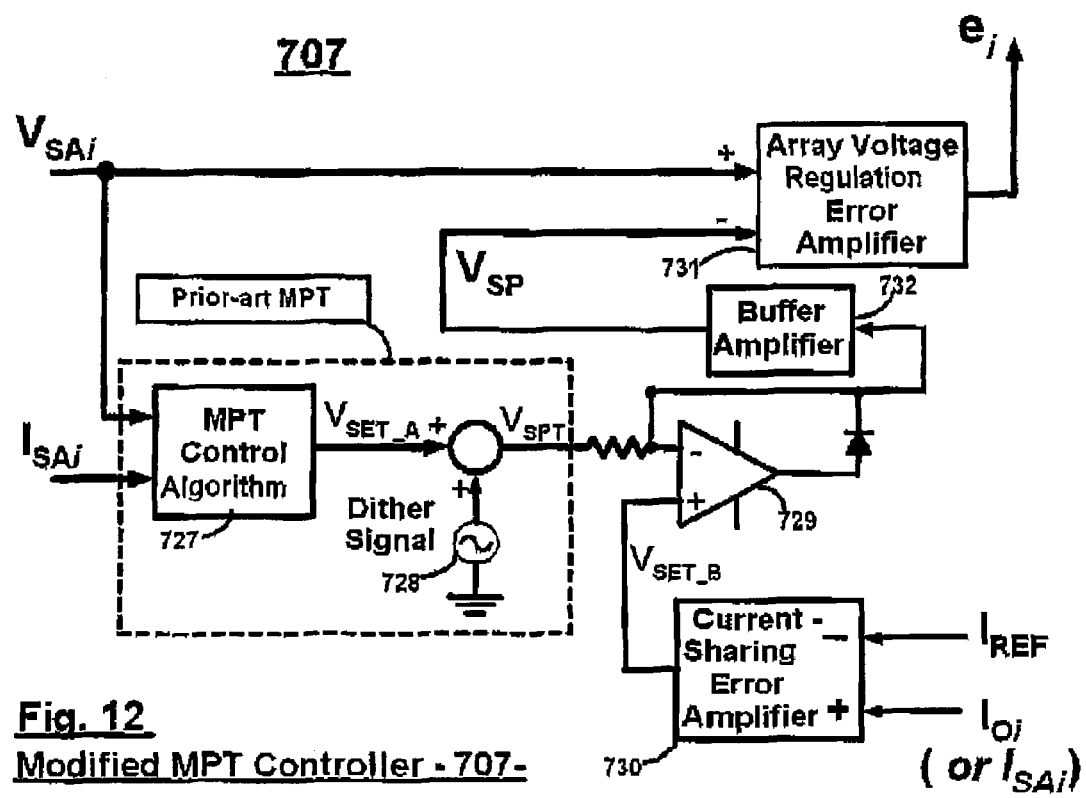
FIG. 12 depicts a modified maximum power tracking controller for uniform current sharing among distributed converters.

FIG. 12 reveals the essential detail of the modified MPT controller that consists of six basic functional blocks: MPT algorithm controller 727, dither signal injector 728, two-input ideal rectifier 729, current-sharing error amplifier 730, buffer amplifier 707 and array voltage regulation error amplifier 731. The controller accepts four inputs as $V_{SAi}$, $I_{SAi}$, $I_{REF}$, and $I_{Oi}$ and delivers one output as $e_i$. The MPT algorithm controller, the dither signal injector, and the array voltage regulation error amplifier are the basic components described in the prior arts taught in patent numbers U.S. Pat. Nos. 6,281,485; 6,369,462; and 6,433,522. For a weak solar array source, its respective converter output current $I_{Oi}$ can drop below the common reference signal $I_{REF}$, causing the output of the current-sharing error amplifier $V_{SET\_B}$ to become saturated at a low level that is less than the minimum voltage set-point $V_{SPT}$ being generated by the prior art MPT controller. This will cause the MPT controller to become active and the solar array voltage commanding reference signal $V_{SP}$ will track $V_{SPT}$, eventually bringing the solar array voltage to reach its maximum power level through the array voltage regulation error amplifier 731. For strong or typical array sources, their respective converter output currents are regulated at a level corresponding to $I_{REF}$ since the output of the current-sharing error amplifier 730 will produce $V_{SET\_B}$ that is above $V_{SPT}$, causing the commanding reference signal $V_{SP}$ to track $V_{SET\_B}$ instead. Thereby, $V_{SET\_B}$ serves as the typical array voltage set-point commanding signal that allows uniform power distribution among the strong and healthy solar array sources. When converter channels belonging to the strong array sources achieve their uniform output current sharing, their input voltages or their solar array voltages $V_{SAi}$ are usually above their corresponding maximum power voltages. During the uniform distribution of the output currents $I_{Oi}$ of the converters that are connected to the strong array sources, their corresponding MPT controllers 727 are in a stand-by mode where their corresponding set-point voltage signals $V_{SET\_A}$ are settled at their minimum voltages not too far below their peak power voltages. The modified MPT controller shown in FIG. 12 and the similar modified control architecture shown in FIG. 11 can be adopted in the previous architectures shown in FIGS. 1, 3, 4, 5, 6, and 10 as well. Furthermore, for the distributed solar array sources that are nearly identical or have very closely matched I-V characteristics while occasionally they may expose to different solar flux, the MMPT controller may be simplified to have only three inputs by tying input $I_{Oi}$ to input $I_{SAi}$ and accepting only the solar array current $I_{SAi}$ as the feedback signal to the controller. Therefore, the simplified MMPT controller eliminates the current sensors used for sensing the converter output currents. The array sources that are exposed to lower solar flux have lower shorted-circuit current but still retain about the same peak power voltage. The simplified three-input MMPT controllers provide nearly uniform power sharing among solar array sources that absorb normal or higher solar flux while automatically offering the sequential MPT for the array sources with lower solar flux.

FIG. 13 shows another power and control architecture that is capable of providing uniform current sharing among the output currents of the converters that process power from their respective strong array sources that directly contribute to the output voltage regulation. For each strong-power array source, its respective converter output current $I_{Oi}$ is tightly regulated to the common value corresponding to the voltage error signal $V_{OE}$ through its respective average current controller #i. The transition from uniform power sharing mode to sequential MPT mode is managed due to a comparison between the $V_{OE}$ and the respective converter output current $I_{Oi}$. The system output voltage regulation error amplifier delivers just sufficient error signal $V_{OE}$ to regulate the system output voltage $V_{OUT}$ at the target value. The average current controller amplifies the difference between the common error signal $V_{OE}$ and the respective sensed output current $I_{Oi}$ and produces the corresponding control signal $V_{CNi}$ as an output for controlling the respective current-mode converter #i through its shared-bus pin SB. Again, the operating voltages of the strong array sources usually settle above their respective peak power voltages.

Since the converters processing power for the weak array sources are not able to deliver sufficient output currents to track the common error signal $V_{OE}$, their respective control signals $V_{CNi}$ will excessively drive their corresponding converters and cause the voltages across the respective weak array sources to collapse below that corresponding to the minimum set-point voltages within the respective MPT controllers. These voltage collapses trigger their respective MPT controllers to wake up and actively take control of their respective converters to have their input voltages track their corresponding peak power voltages. Consequently, the weak array sources participate in sharing their maximum powers to the common load through their respective controllers MPT#i.

FIG. 14 reveals the third hybrid distributed power and control architecture that provides uniform current sharing among strong solar array sources using the modular converter modules that have the same internal power and control configuration as that shown in FIG. 9. In the same manner, the architecture offers automatically sequential MPT among weak solar array sources that gradually fail to provide uniform current-sharing as load demand increases. The distributed modular converter architecture employs the shared error (SHE) voltage that is selected to be the highest error voltage by tying their SHE pins together; thereby, eliminating the external output voltage regulation error amplifier. The interconnected modular converters with the common SHE signal automatically choose one output-voltage regulation error amplifier within one modular converter that possesses the highest internal reference voltage that commands the interconnected converter power architecture to regulate the system output voltage to its corresponding target value. In this manner, there is no conflict in the output voltage regulation since all converters share the same commanding signal from the tied SHE pins. Uniform distribution among the output currents of the converters that process the strong array sources is achieved through the insertion of current-error correction signals $I_{E1}, I_{E2}, \ldots,$ and $I_{EN}$ at the VOS pins of the respective modular converters #1, #2, . . . , and #N. These correction signals $I_{Ei}$ provide the respective offset controlling voltages that are superimposed on the common SHE signal to regulate the respective converter output currents $I_{O1}, I_{O2}, \ldots,$ up to $I_{ON}$ to the maximum-limit (ML) reference current signal $I_{REF}$. The ML reference signal $I_{REF}$ is chosen from the highest sensed output current among all the sensed output currents of participating converters through the N ideal rectifier network. The respective current-error amplifiers #1, #2, . . . , to #N amplify and frequency-compensate the corresponding differences between $I_{REF}$ and $I_{Oi}$ as their respective current-error correction signals $I_{Ei}$. For the weak array sources, their correction signals $I_{Ei}$ can be saturated at a high level since their respective converters may deliver their sensed output currents significantly below the ML reference signal $I_{REF}$ and this causes the respective array voltages to collapse below the minimum set-point voltages within the respective MPT controllers. Again, these collapsed array voltages trigger their respective MPT controllers to actively take control of their respective converters to keep their input voltages tracking their corresponding peak power voltages. Consequently, the weak array sources participate in sharing their maximum powers to the common load through their respective controllers MPT#i while the strong array sources have their uniform power distribution and actively participate in the system output voltage regulation.

Another variation to the logic of the embodiments shown in the individual component circuits of FIGS. 1 to 14 is to program the logic steps into digital signal processors or processor chips (DSP). There may be a single master DSP or their may be individual DSP for each power source array. The sequential shifting to maximum power tracking may be managed by software steps programmed into the single master or individual DSPs. Where there are individual DSPs for each power array, the arrays may be individually sold with their DSP. These would be self contained sequential solar or power arrays. This would allow a consumer or contractor to purchase as many power arrays as they need and they could then plug the arrays in. Each array would have a power bus and a communication bus.

As described above, the power and control architecture of this invention provide a number of advantages, some of which have been described above and others of which are inherent in the invention. Also modifications may be proposed to the power and control architecture of this invention without departing from the teachings herein.

We claim:

1. A distributed solar array power system, comprising:
   a series of solar array power sources, each said solar array power source engaged to a modified maximum power tracking circuit and configured to uniformly share load until power delivered by a first weakest array reaches a maximum, wherein said first weakest array being removed from active participation of common load bus voltage regulation and staying in maximum power mode;
   said other arrays continuing to uniformly share power to load and actively participate in common load bus voltage regulation until power delivered by a next weakest array reaches a relative maximum; and
   as said next weakest array shifts to maximum power, then a next relative weakest power source becomes a next relative weakest being removed from active participation of common load bus voltage regulation and staying in maximum power mode, while all other power sources continue to uniformly increase load and jointly control load bus voltage there being no predefined sequence about which solar array power source will be operating in the maximum power tracking mode.

2. The power system of claim 1, wherein:
   said series of solar army power sources each having an output engaged to be regulated by a current mode converter;
   each said current mode converter being engaged to one of said modified maximum power tracking circuits, said maximum power tracking circuits engaged to regulate said converters to operate at a maximum power when power delivered by said power sources reach a maximum;
   an output voltage amplifier providing a common reference current signal to each of said modified maximum power tracking circuits;
   each said converter being engaged to output on a common load bus having a common load;
   each said converter output current being individually measured and fed back to said associated modified maximum power tracking circuit for comparison with said common reference current signal;
   control circuitry to allow associated solar array power source and current mode converter to uniformly energize, with respect to other non-maximum-power solar array power sources and associated current-mode converters, to provide power to said common load bus and provide power and voltage regulation for said common load bus until a first solar array source and converter operate at maximum power as detected and controlled by said associated modified maximum power tracking circuit as a result of transition of said comparison between said dc-dc converter output current and said common reference current signal, after which remaining non-maximum-power solar army power sources operate to provide uniform power shares to load and provide voltage regulation for said common load bus with said first solar array continuing at maximum power until a second solar army power source operates at maximum power as detected and controlled by said associated modified maximum power tracking circuit as a result of transition of said comparison between converter output current for that second solar array and said common reference current signal, after which less remaining nonmaximum-power solar array power sources operate to provide uniform power shares to load and provide voltage regulation for said common load bus with said first and second solar arrays continuing at maximum power until a third solar array power source operates at maximum power as detected and controlled by said associated modified maximum power tracking circuit as a result of transition of said comparison between converter output current for that third solar array and said common reference current signal; and control circuitry to sequence back for restoring one at a time out of the maximum-power-mode solar arrays back to the uniformly-distributed power-mode solar arrays as load decreases with only those solar arrays not at maximum power providing common load bus voltage regulation on load decreases as well as increases.

3. The power system of claim 1, wherein:

said series of solar array power sources each having an output engaged to be regulated by a current mode converter;

each said current mode converter being engaged to one of said maximum power tracking circuits, said maximum power tracking circuits engaged to regulate said converters to operate at a maximum power when power delivered by said power sources reach a maximum;

an output voltage regulation error amplifier providing a common reference voltage signal to all average current controllers being associated individually and respectively with said maximum power tracking circuits and current mode converters;

each said converter being engaged to output on a common load bus having a common load;

each said converter output current being individually measured and fed back to said average current controller for comparison with said common reference voltage signal;

control circuitry to allow said solar array power sources and associated converters to uniformly energize to provide power to said common load bus and provide power and voltage regulation for said common load bus until a first solar array source and converter operate at maximum power as detected and controlled by said associated maximum power tracking circuit as a result of transition of said comparison between said converter output current and said common reference voltage signal at said average current controller being associated with said first solar array source, after which remaining non-maximum-power solar array power sources operate to provide uniform power shares to load and provide voltage regulation for said common load bus with said first solar array continuing at maximum power until a second solar array power source operates at maximum power as detected and controlled by said associated maximum power tracking circuit as a result of transition of said comparison between said converter output current and said common reference voltage signal at said average current controller being associated with said second solar array source, after which less remaining non-maximum-power solar array power sources operate to provide uniform power shares to load and provide voltage regulation for said common load bus with said first and second solar arrays continuing at maximum power until a third solar array power source operates at maximum power as detected and controlled by said associated maximum power tracking circuit as a result of transition of said comparison between converter output current for that third solar army and said common reference voltage signal; and control circuitry to sequence back for restoring one at a time out of the maximum-power-mode solar arrays back to the uniformly-distributed power-mode solar arrays as load decreases with only those solar arrays not at maximum power providing common load bus voltage regulation as load decreases as well as increases.

4. The power system of claim 1, wherein:

said series of solar array power sources each having an output engaged to be regulated by a converter module; and each said converter module being engaged to one of said maximum power tracking circuits, said maximum power tracking circuits engaged to regulate said converter modules to operate at a maximum power when power delivered by said power sources reach a maximum;

a current error amplifier for each converter module, each said current error amplifier having inputs of a common current reference signal as well as associate individual converter output current;

each said current error amplifier providing an input to said associated converter module;

said converter modules also having a common shared error signal as the common controlling contributor in addition to individual controlling contributors being the respective output signals of said current error amplifiers;

each said converter module output current being individually measured and fed back to said associated current error amplifier for comparison with said common reference current signal; and control circuitry to allow said solar array power sources and associated converter modules to uniformly energize to provide power to said common load and provide power and voltage regulation for said common load bus until a first solar array source and converter module operate at maximum power as detected and controlled by said associated maximum power tacking circuit as a result of transition of said comparison between said converter module output current and said common reference current signal, after which remaining non-maximum-power solar array power sources operate to provide uniform power shares to load and provide voltage regulation for said common load bus with said first solar array continuing at maximum power until a second solar array power source operates at maximum power as detected and controlled by said associated maximum power tracking circuit as a result of transition of said comparison between converter output current for that second solar array and said common reference current signal, after which less remaining non-maximum-power solar array power sources operate to provide uniform power shares to load and provide voltage regulation for said common load bus with said first and second solar arrays continuing at maximum power until a third solar array power source operates at maximum power as detected and controlled by said associated maximum power tracking circuit as a result of transition of said comparison between said converter module output current for that third solar array and said common reference current signal; and control circuitry to sequence back for restoring one at a time out of the maximum-power-mode solar arrays back to the uniformly-distributed power-mode solar arrays as load decreases with only those solar arrays not at maximum power providing common load bus voltage regulation as load decreases as well as increases.

5. A distributed power system, comprising:

a solar array power source or set of solar array sources configured to sequentially energize to provide power to a common load bus and provide power and voltage regulation for said common load bus until all said solar array sources operate at maximum power, after which a first non-solar-array power source operates to provide power and voltage regulation for said common load bus with all said solar arrays continuing at maximum power until said first non-solar-array power source operates at optimal power, after which a second non-solar-array power source operate to provide power and voltage regulation for said common load bus with all said solar arrays continuing at maximum power and said first non-solar-array power source continuing at optimal power while subsequent non-solar-array power sources may sequence on in the same manner that the most recently sequenced-on-non-solar-array power source provides power and common load bus voltage regulation until reaching optimal power, and, protection control circuits each of which is dedicated for protecting each non-solar-array power source from a harmful operating condition such as over-current drawn from the power source and causes the power source to operate at optimal power which ensures safe and reliable operation, there being no predefined sequence about which non-solar array source will be operating in the maximum power.

6. A modified maximum power tracking circuit, comprising:

a maximum power tracking algorithm controller having a power source current signal and a power source voltage signal as inputs and providing a VSET_A output to combine with a dither signal from a dither signal injector to efficiently hunt for maximum power output, there being no predetermined sequence as to which power source will be operating in the maximum power mode;

a combined VSET_A and dither signal output providing an input to a first input VSPT to a two-input ideal rectifier;

a current-sharing error amplifier having a common current reference signal and an individual converter output current signal as inputs;

said current sharing error amplifier comparing said common current reference signal and an individual converter output current signal to provide a VSET_B second input to said two-input ideal rectifier;

output of said two-input ideal rectifier passing through a buffer amplifier to provide a voltage set point input VSP to an array voltage regulation error amplifier wherein said voltage set point input VSP having the voltage being equal to the higher voltage of either said dithered VSET_A signal or said VSET_B signal;

said array voltage regulation error amplifier having said power source voltage signal as an input for comparison with the output signal of the said two-input ideal rectifier; and said array voltage regulation error amplifier producing an output being a voltage regulation signal to a converter controlling said power source.

* * * * *